United States Patent [19]

Hwang

[11] Patent Number: 4,971,405
[45] Date of Patent: Nov. 20, 1990

[54] PHOTOELECTRICALLY CONTROLLED CORNER LIGHT SYSTEM FOR A VEHICLE

[76] Inventor: Yong An Hwang, 719-39 Jisan-1-Dong-Ku, Kwang-Ju Jikhalsi, Rep. of Korea

[21] Appl. No.: 147,211

[22] Filed: Jan. 22, 1988

[30] Foreign Application Priority Data

Jan. 23, 1987 [KR] Rep. of Korea ............ 87-519

[51] Int. Cl.⁵ .................. B60Q 1/24; H05B 39/06
[52] U.S. Cl. ........................... 315/77; 315/83; 315/153; 315/155
[58] Field of Search ............ 315/80, 82, 83, 153, 315/155, 77

[56] References Cited

U.S. PATENT DOCUMENTS

| | | | |
|---|---|---|---|
| 2,853,651 | 9/1958 | Jacobs | 315/83 |
| 2,927,245 | 3/1960 | Irland et al. | 315/83 |
| 3,023,344 | 2/1962 | Owings | 315/83 |

Primary Examiner—Eugene R. LaRoche
Assistant Examiner—Ali Neyzari

[57] ABSTRACT

A photoelectrically controlled corner light system for a vehicle includes corner lights adjacent to headlights which are disposed in the right and left corners of the vehicle. The corner lights switched by operating a headlight turn lever are connected to a light detecting sensor for operatively controlling the brightness of its illumination. The light detecting sensors detects the light of headlights from opposing vehicles and controls the brightness of the illumination in the light system to prevent the view of a driver of the opposing vehicle from being disturbed.

6 Claims, 3 Drawing Sheets

PHOTOELECTRICALLY CONTROLLED CORNER LIGHT SYSTEM FOR A VEHICLE

BACKGROUND OF THE INVENTION

1. Field of the Invention

The present invention relates to a photoelectrically controlled corner light system for vehicles and particularly, corner lights which are capable of illuminating adequately the right and the left side areas of a vehicle where the illumination from the headlight is not sufficient. The corner light adjacent to the headlight is installed at the right and the left front corners of the vehicle, respectively. These corner lights are switched on or off easily by selectively operating a headlight turn lever. Also, a light detecting sensor operated by photoelectric control circuits is disposed at the front windows of the vehicle and automatically detects the light from the headlight of vehicles moving in an opposition direction which flash within the illumination angle of the right and left corner light. Therefore, the brightness of the corner lights is automatically adjusted and a disturbance to the view of the driver in an opposing vehicle does not result.

2. Description of the Prior Art

Conventional headlights to sufficient for illuminating the front side of the driving vehicles. However, it is not sufficient for illuminating the right and the left sides of the vehicles. Therefore, the vehicle is vulnerable to obstacles at its sides. When the vehicle is turning at a corner, the corner area of the vehicle cannot be adequately illuminated by the headlight. An idea proposed for solving this problem is that the headlight of the vehicle rotates with the steering wheel which is rotated by the driver. However, it is impossible to illuminate both side areas of the vehicle when the vehicle moves straight, and to simultaneously control the illumination of its headlights so that the driver's view an the opposing vehicle is not disturbed.

Although the necessity of a corner light system of a vehicle has been desired, so far, a satisfactory solution has never been provided, because of the serious disturbance to the view in driver of the opposing vehicles.

SUMMARY OF THE INVENTION

Accordingly, it is an object of the present invention to provide a corner light system which is structured with corner lights adjacent to headlights of a vehicle for flashing both side areas of the front right and left corner of the vehicle.

Another object of the present invention is to provide corner lights connected to a light detecting sensor disposed at a front windshield of a vehicle for automatically controlling the brightness of the corner light is response to the light headlights of vehicle moving in an opposite direction so that the driver's view in the opposite vehicle is not disturbed.

A further object of the present invention is to provide corner lights in a corner light system which may be switched by operating a headlight turn lever of a vehicle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a photoelectrically controlled corner light system for a vehicle which includes corner lights adjacent to headlights which are disposed in the right and left corners of the vehicle. The corner lights switched by operating a headlight turn lever are connected to a light detecting sensor for controlling the brightness of its illumination which is caused by the light of headlights from vehicles to prevent a disturbance in the view of the driver in the opposite vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
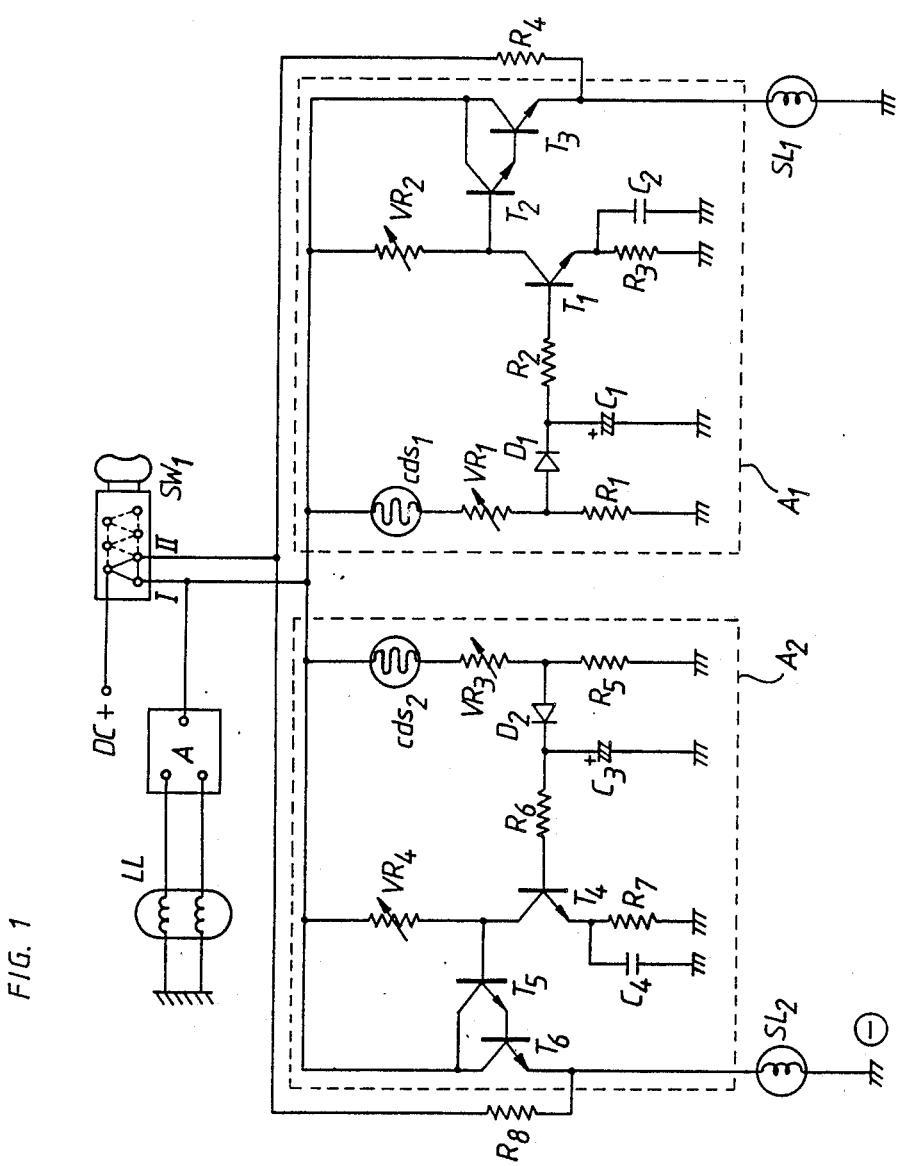
FIG. 1 is a negative (−) grounded circuit diagram in view of the corner light system in one embodiment of the present invention.
Figure 2:
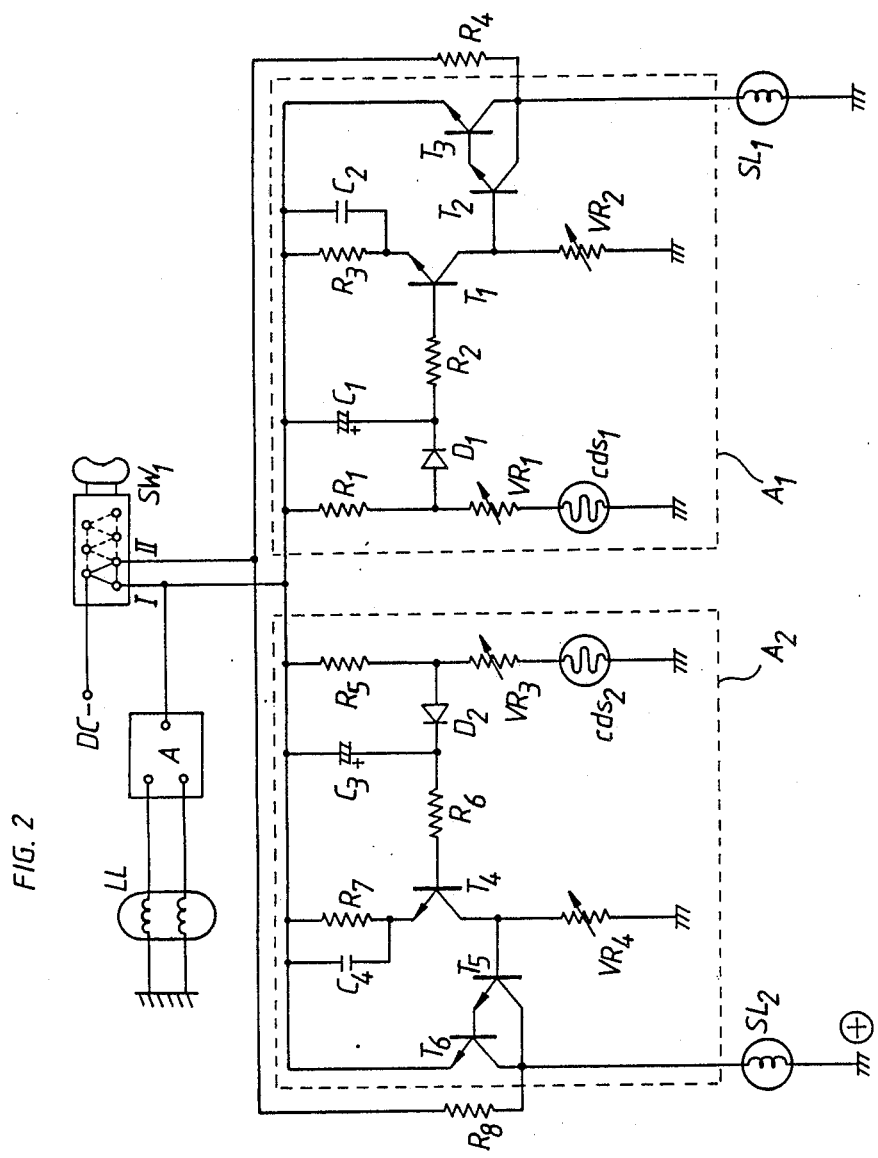
FIG. 2 is a positive (+) grounded circuit diagram in view of the corner light system in a second embodiment of the present invention.
Figure 4:
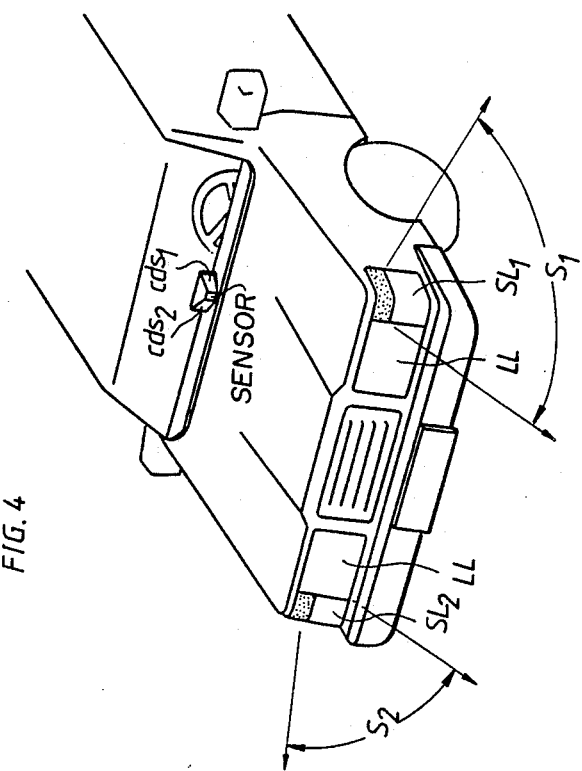
FIG. 4 is a perspective view of a corner light system installed in the vehicle of the present invention.
Figure 3:
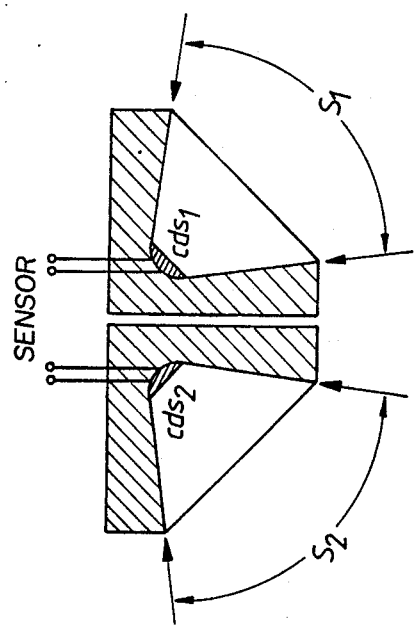
FIG. 3 is a cross-sectional view of the light detecting sensor.

Referring now in detail to the drawings for the purpose of illustrating preferred embodiments of the present invention, the photoelectrically controlled corner light system as shown in FIGS. 1, 2, and 4 includes a left corner light $SL_1$ and a right corner light $SL_2$ which are adjacent to headlights LL and are disposed at the front left and right corners of a vehicle. The left corner light $SL_1$ is installed at the left front corner of the vehicle for illuminating a scope in the left direction $S_1$ and the right corner light $SL_2$ is installed at the right front corner of the vehicle for illuminating a scope in the right direction $S_2$.

In the corner light system, a switching circuit for illuminating the corner lights $SL_1$ and $Sl_2$ is designed to switch on/off selectively by operating a headlight turn lever. In addition, the vehicle power source is coupled to the source parts of photoelectric control circuits $A_1$ and $A_2$ through a headlight switch terminal I of a headlight switch $SW_1$. Accordingly, the corner lights $SL_1$ and $SL_2$ can be turned on/off simultaneously with the headlights LL. The photoelectric control circuits A1 and A2 for the left and right corner lights $SL_1$ and $SL_2$ include left and right photoresistive elements $cds_1$ and $cds_2$ disposed in the sensor which are attached to the inside of windshield of the vehicle.

The photoresistive elements $cds_1$ and $cds_2$ detect the light within illuminating scope areas $S_1$, $S_2$ of the corner lights $SL_1$ and $SL_2$. Depending on the intensity of the detected light flashed from the opposing vehicles, the brightness of the corner lights $SL_1$ and $SL_2$ is automatically adjusted so that the driver's view is not disturbed by an approving vehicle.

In the left corner light system, the photoresistive element $cds_1$ is connected to the source through the headlight switch terminal I of the headlight switch $SW_1$ and is connected to the ground through a variable resistor $VR_1$ and a resistor $R_1$. At point between the variable resistor $VR_1$ and the resistor $R_1$, a diode $D_1$ is connected and to a diode $D_1$ grounded through a electrolytic capacitor $C_1$. Also, the diode $D_1$ is coupled to the base of the transistor $T_1$ through a resistor $R_2$.

A collector of the transistor $T_1$ is connected to the power source through a variable resistor $VR_2$ and to the base of Darlington circuits $T_2$ and $T_3$.

An emitter of the transistor $T_1$ is grounded through a resistor $R_3$ and a capacitor $C_2$. The collector of the Darlington circuits $T_2$ and $T_3$ is connected to the power source, and the emitter of the Darlington circuits $T_2$ and $T_3$ is connected to ground through the left corner light $SL_1$.

When the headlight switch terminal I of the headlight switch $SW_1$ is switched on at night to turn on the headlights LL, the current from the power source flows into the photoelectric control circuit $A_1$ and turns on the left corner light $SL_1$. When light flashes from the headlight of an opposing vehicle or any other illuminating lights is detected by the left side photoresistive element $cds_1$ of the sensor within the left illuminating scope area $S_1$ of the left corner light $SL_1$, the internal resistance of the photoresistive element $cds_1$ decreases. Therefore, the electrolytic capacitor $C_1$ is charged which causes the base voltage of the transistor $T_1$ to increase. By causing the current of the transistor $T_1$ to increase, the base voltage of the Darlington circuits $T_2$ and $T_3$ decreases. Accordingly, the current between the collector and the emitter of the Darlington circuits $T_2$ and $T_3$ reduces. The reduction in the brightness of the left corner light $SL_1$ equals level in which the driver of an opposing vehicle is not disturbed. Thus, the left side area of vehicle is low-illuminated by the left corner light $SL_1$. However, the reduced illumination can be compensated by the light flashed from the headlight of an opposing vehicle. When the light from the headlight of an opposing vehicle passes out of the illuminating scope area $S_1$ of the left corner light $SL_1$, the internal resistance of the left side photoresistive element $cds_1$ increases. Thus it causes the electrolytic capacitor $C_1$ discharges for a delayed period. After the delayed period, the base voltage of the transistor $T_1$ decreases and the current between the collector and the emitter of the transistor $T_1$ decreases. The base voltage of the Darlington circuits $T_2$ and $T_3$ increases and the current at the collector increases. Therefore, the brightness of the left corner light $SL_1$ increases to a high degree and illuminates the left side area of the vehicle.

In the right corner light system, a photoresistive element $cds_2$ is connected to the source through the headlight switch terminal I of the headlight switch $SW_1$ and the element is grounded through a variable resistor $VR_3$ and a resistor $R_5$. The point between the variable resistor $VR_3$ and the resistor $R_5$ is connected to a diode $D_2$ and is grounded through an electrolytic capacitor $C_3$. Also, the diode $D_2$ is coupled to the base of a transistor $T_4$ through a resistor $R_6$. The collector of a transistor $T_4$ is connected to the power source member through the variable resistor $VR_4$ and to the base of Darlington circuits $T_5$ and $T_6$. An emitter of the transistor $T_4$ is grounded through a resistor $R_7$ and a capacitor $C_4$. The collector of the Darlington circuits $T_5$ and $T_6$ is connected to the power source, and the emitter of the Darlington circuits $T_5$ and $T_6$ is connected to ground through the right corner light $SL_2$.

When the headlight switch terminal I of the headlight switch $SW_1$ is switched on at night to turn on the headlight LL, the current from the source flows into the photoelectric control circuit $A_2$ and turns on the right corner light $SL_2$. When light flashes from the headlight of an opposing vehicle an is detected by the right side photoresistive element $cds_2$ of the sensor within the illuminating scope area $S_2$ of the right corner light $SL_2$, the internal resistance of the photoresistive element decreases. Therefore, the electrolytic capacitor $C_3$ is charged by causing the base voltage of the transistor $T_4$ to increase. The current of the transistor $T_4$ increases and the base voltage of the Darlington circuits $T_5$ and $T_6$ so that the current between the collector and emitter of the Darlington circuits $T_5$ and $T_6$ is reduced. Therefore, the reduction of brightness for the right corner light $SL_2$ equals a level in which the driver of an opposing vehicle is not disturbed. The right side area of vehicle is low-illuminated by the right corner light $SL_2$. However, the reduced illumination can be compensated by the light flashed from the headlight of the opposite vehicle. When the light flashed from the headlight of the opposite vehicle passes out of the illuminating scope area $S_2$ of the right corner light $SL_2$, the internal resistance of the right side photoresistive element $cds_2$ increases.

Thereby, the electrolytic capacitor $C_3$ discharge for a delayed period. After the delayed period, the base voltage of the transistor decreases. Thus, the current between the collector and the emitter of the transistor $T_4$ decreases and the base voltage of the Darlington circuits $T_5$ and $T_6$ increases so that current at the collector increases. The brightness of the right corner light $SL_2$ increases to a high degree and illuminates the right side area of the vehicle.

The electrolytic capacitors $C_1$ and $C_3$, in the above system, provide a delayed time in order to prevent the right and the left corner lights $SL_1$ and $SL_2$ from becoming bright before an opposing vehicle completely passes by. When an opposing vehicle with its headlight on comes closer from the front, the light intensity measured within an angle of the illuminating scope of 10 degrees is about 5,000 Cd. On the other hand, the light intensity detected at an angle of more than 20 degrees is less than 500 Cd. Therefore, at this time, the sensor installed on the vehicle may sense the weaker light intensity.

That is, when the vehicles are closer to an opposing vehicle, the sensor can sense the weaker light intensity. The electrolytic capacitors $C_1$ and $C_3$ functions the corner lights $SL_1$ and $SL_2$ to become bright after an opposing vehicle passes by completely. Another function of the electrolytic capacitors $C_1$ and $C_3$ prevents the driver's view from being disturbed while opposing vehicles pass by continuously.

The variable resistors $VR_1$ and $VR_3$ is used to adjust the distance from an opposing vehicle where the control of the corner lights $SL_1$ and $SL_2$ is started. The other variable resistors $VR_2$ and $VR_4$ are used to change the illumination intensity of the corner lights $SL_1$ and $SL_2$ depending on weather.

A side marker switch terminal II of the headlight switch $SW_1$ is connected a constant current supply through the resistors $R_4$ and $R_8$ to the emitter of the Darlington circuits $T_3$, $T_4$, $T_5$ and $T_6$. Such constant current supply is small and keeps the both corner lights $SL_1$ and $SL_2$ dimly lit. This constant dim light plays the role of the side marker light. All of the description hereinbefore has been with respective to negative (−) ground components. The second embodiment of the present invention is directed to positive ground components where a positive (+) power source replaces the negative (−) power source of the headlight switch $SW_1$ and a positive (+) ground component replaces the negative (−) ground component. However, the locations of the right and the left corner lights and the connection of the side marker circuit are moved from the emitter side to the collector side in the Darlington circuits $T_2$, $T_3$, $T_5$, and $T_6$.

Accordingly, in the corner light system of the present invention adequately illuminates the right and the left side areas of the vehicle by operating the corner lights $SL_1$ and $SL_2$ that are switched on by the headlight switch $SW_1$ when the vehicle is driven in the dark. However, when an illumination of the side areas of the vehicle is not needed such as, for example, when the headlight of an opposing vehicle illuminates or under the illuminating light from street lights in a downtown area, the brightness of the left and right corner lights $SL_1$ and $SL_2$ is automatically adjusted so that the view of the driver in an opposing vehicle and the pedestrians are not disturbed. Consequently, traffic accidents related to the inefficient side illumination in the dark areas at night can be reduced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A photoelectric controlled corner light system for a vehicle which comprises:
   a left headlight and a right headlight for illuminating a forward area of the vehicle;
   a left corner light and a right corner light adjacent to said left and right headlights for illuminating a left side area and a right side area of the vehicle, respectively;
   left corner light sensing means having a left side photoresistive device for detecting the amount of light in said left side area, said left corner light sensing means being connected to said left corner light for variably illuminating said left corner light in response to the amount of light detected by said left side photoresistive device;
   right corner light sensing means having a right side photoresistive device for detecting the amount of light in said right side area, said right corner light sensing means being connected to said right corner light for variably illuminating said right corner light in response to the amount of light detected by said right side photoresistive device; and
   an on/off switch operatively associated with a headlight switch of the vehicle for initiating the operation of said left and right corner lights, whereby said left and right corner lights are photoelectrically illuminated in response to said left corner light and said right corner light sensing means which are responsive to external light and prevent an undesirable use of said left and right corner lights.

2. A photoelectric controlled corner light system as claimed in claim 1, wherein said left corner light sensing means comprises said left side photoresistive device being connected to said on/off switch, a first variable resistor and a first resistor; said first variable resistor and said first resistor being connected to a first diode, a first capacitor, and a second resistor; said second resistor being connected to the base of a first transistor; the collector of said first transistor being connected to a second variable resistor and the base of a first Darlington circuit; the emitter of said first transistor being connected to a third resistor; and a second capacitor; and the emitter of said first Darlington circuit being connected to said left corner light.

3. A photoelectric controlled corner light system as claimed in claim 2, wherein said right corner light sensing means comprises said right side photoresistive device being connected to said on/off switch, a third variable resistor and a fifth resistor; said fifth resistor being connected to a second diode, a third capacitor and a sixth resistor; said sixth resistor being connected to the base of a second transistor; the collector of said second transistor being connected to a fourth variable resistor and the base of a second Darlington circuit; the emitter of said second transistor being connected to a seventh resistor; and a fourth capacitor; and the emitter of said second Darlington circuit being connected to said right corner light.

4. A photoelectric controlled corner light system as claimed in claim 1, wherein said left corner light sensing means comprises said left side photoresistive device being connected to said on/off switch by a first variable resistor and a first resistor; said first variable resistor and said first resistor being connected to a first diode, a first capacitor and a second resistor; said second resistor being connected to the base of a first transistor; the collector of said first transistor being connected to a second variable resistor and the base of a Darlington circuit; the emitter of said first transistor being connected to a third resistor and a second capacitor; and the collector of said first Darlington circuit being connected to said left corner light.

5. A photoelectric controlled corner light system as claimed in claim 4, wherein said right corner light sensing means comprises said right side photoresistive device being connected to said on/off switch by a third variable resistor and a fifth resistor; said third variable resistor and said fifth resistor being connected to a second diode, a third capacitor and a sixth resistor; said sixth resistor being connected to the base of a second transistor; the collector of said second transistor being connected to a fourth variable resistor and the base of a second Darlington circuit; the emitter of said second transistor being connected to a seventh resistor and a fourth capacitor; and the collector of said second Darlington circuit being connected to said right corner light.

6. A method for photoelectrically controlling a corner light system of a vehicle, comprising the steps of:
   (a) illuminating a forward area of the vehicle by a right headlight and a left headlight, a left side area of the vehicle by a left corner light and a right side area of the vehicle by a right corner light;
   (b) detecting the amount of light in said left side area of the vehicle;
   (c) variably illuminating said left corner light in response to the amount of light detected in said left side area by step (b);
   (d) detecting the amount of light in said right side area of the vehicle; and (e) variably illuminating said right corner light in response to the amount of light detected in said right side area by step (d);

whereby said left and right corner lights are photoelectrically illuminated in response to steps (b) and (d) which are responsive to external light and prevent an undesirable use of said left and right corner lights.

* * * * *